US006119055A

United States Patent [19]

Richman

[11] Patent Number: 6,119,055

[45] Date of Patent: Sep. 12, 2000

[54] REAL TIME IMAGING SYSTEM AND METHOD FOR USE IN AIDING A LANDING OPERATION OF AN AIRCRAFT IN OBSCURED WEATHER CONDITIONS

[75] Inventor: Isaac Richman, Newport Beach, Calif.

[73] Assignee: McDonnell Douglas Corporation, Huntington Beach, Calif.

[21] Appl. No.: 09/218,227

[22] Filed: Dec. 22, 1998

Related U.S. Application Data

[63] Continuation-in-part of application No. 09/012,800, Jan. 23, 1998, abandoned.

[51] Int. Cl.[7] ........................ G06F 19/00

[52] U.S. Cl. ........................ 701/16; 701/1; 340/960; 340/945; 340/948; 340/947; 244/183; 244/81; 244/75 R; 244/1

[58] Field of Search ........................ 701/16, 1; 340/945, 340/948, 947, 960; 342/33, 63; 244/183, 81, 75 R, 1; 318/583

[56] References Cited

U.S. PATENT DOCUMENTS

| | | | |
|---|---|---|---|
| 1,936,400 | 11/1933 | Langmuir . | |
| 3,510,834 | 5/1970 | Durand . | |
| 3,643,213 | 2/1972 | Yurasek et al. . | |
| 3,671,963 | 6/1972 | Assouline et al. . | |
| 3,952,309 | 4/1976 | Lammers . | |
| 4,210,930 | 7/1980 | Henry | 348/117 |
| 4,419,731 | 12/1983 | Puffett . | |
| 4,866,626 | 9/1989 | Egli . | |
| 4,868,567 | 9/1989 | Eichweber . | |
| 5,559,510 | 9/1996 | Strong, III et al. . | |
| 5,838,276 | 11/1998 | Chapman et al. | 342/35 |

*Primary Examiner*—Tan Nguyen
*Assistant Examiner*—Olga Hernandez
*Attorney, Agent, or Firm*—Harness Dickey & Pierce P.L.C.

[57] ABSTRACT

An imaging apparatus for aiding landing of aircraft in weather conditions obscuring a pilot's view of a runway. The apparatus comprises a plurality of LED assemblies which are disposed along the runway. Each LED assembly includes a plurality of LEDs, a receiver and a plurality of drivers responsive to the receiver for energizing the LEDs. The LEDs of each LED assembly are pulsed on by signals from a transmitter disposed adjacent an end of the runway. The transmitter also sends synchronization signals to a receiver located on board the approaching aircraft. The receiver on the aircraft is coupled to a processor which uses the synchronization signals to determine when the LEDs are energized and when they are not energized. The processor controls a CCD camera mounted on the aircraft so as to obtain an unobstructed view of the approaching runway. The processor controls the CCD camera such that the camera takes images (i.e., frames) while the LEDs are pulsed on and also while the LEDs are off. The frames with the LEDs off are then digitally subtracted from the frames taken while the LEDs were energized to produce enhanced images which are output to a visual display on-board the aircraft and which do not include the objectionable radiant background information. In an alternative embodiment a plurality of independent groups of LED assemblies are controlled in accordance with separate synchronization frequencies. The pilot is instructed which synchronization frequency to select, and only the LED assemblies corresponding to the selected group appear as being continuously illuminated on board the visual display on the aircraft.

32 Claims, 6 Drawing Sheets

REAL TIME IMAGING SYSTEM AND METHOD FOR USE IN AIDING A LANDING OPERATION OF AN AIRCRAFT IN OBSCURED WEATHER CONDITIONS

CROSS REFERENCE TO RELATED APPLICATION

This is a continuation-in-part of U.S. patent application Ser. No. 09/012,800, filed Jan. 23, 1998, now abandoned.

TECHNICAL FIELD

This invention relates to apparatus and methods for aiding an operator of an aircraft in visualizing a runway during inclement weather conditions obstructing the operator's view of the runway during a landing approach. More specifically, the invention relates to a method and apparatus using radiant energy sources to delineate the runway and an imaging system carried on the aircraft for receiving and filtering the radiant energy signals to provide a visual display in accordance with the filtered signals to aid in landing the aircraft during poor visibility weather conditions.

BACKGROUND OF THE INVENTION

Background Art

Aircraft landings in fog, rain, haze and other inclement weather conditions tending to obscure a pilot's view of a runway during a landing approach are controlled by FAA regulations for commercial aircraft and by military regulations at military airfields. In the absence of an appropriate all-weather instrument landing system (ILS), landing restrictions are based on the distance at which the runway may be visually discerned by the pilot of the aircraft. This distance is called the "runway visible range" (RVR) when no landing aid is employed. There are two major effects which limit the RVR: the extinction coefficient of the intervening fog, clouds or haze; and the masking radiation scattered to the observer from sources other than runway lights. The masking radiation includes backscatter from the sun, moon, aircraft lights and scatter from radiation sources on the ground. Backscatter from the sun, moon and aircraft head lamps is mostly time invariant over periods of tenths of a second, with some approximately random fluctuations. Aircraft wing and tail lamps are periodic with periods long compared to about 25 Hz. Backscatter from sources on the ground is usually from either arc lamps, incandescent lamps, or fluorescent lamps. These have a DC component, and one at twice the power line frequency ($2f_p$) plus harmonics. Examples of approximate extinction coefficients for various RVR's are given in the following table:

| Runway visual range | 500 ft. 152.5 m | 700 ft. 213.5 m | 1100 ft. 335.5 m | 2100 640.5 m |
|---|---|---|---|---|
| Extinction coefficient, day ($m^{-1}$) | 0.03246 | 0.02040 | 0.01091 | 0.00403 |
| Extinction coefficient, night ($m^{-1}$) | 0.08721 | 0.05883 | 0.03477 | 0.01619 |

The RVR for a given landing category also varies somewhat from airport to airport. The following approximate values are typical:

| Category | Minimum RVR |
|---|---|
| Cat I | 1800–2400 ft. (549–732 m) |
| Cat II | 1200 ft. (366 m) |
| Cat IIIa | 700 ft. (213.5 m) |
| Cat IIIb | 300 ft. (91.5 m) |
| Cat IIIc | 0 ft. |

When the RVR is less than a minimum distance set by the FAA for commercial aircraft, or by the military for military aircraft landing at military airfields, the aircraft will not be allowed to land. Obviously, this can cause significant delays. With a commercial aircraft, the aircraft may need to be rerouted to an airport in another city where weather conditions permit landing the aircraft. In military applications, military aircraft such as military transport aircraft must be able to land near a battlefield and often at airfields with limited support systems. Frequently, either the aircraft or the airfield, or both, are not equipped with the appropriate all-weather instrument landing systems needed to safely land an aircraft under obscured visual conditions. Since all-weather instrument landing systems are also expensive to install, there exists a need for an alternative system and method for enabling a pilot of an aircraft, whether military or commercial, to adequately visualize a runway during poor weather conditions in order to land the aircraft.

While various apparatus have been developed in an attempt to aid a pilot in visualizing a runway during weather conditions obscuring the pilot's vision, such systems have generally proven to be fairly expensive and/or complicated to install on the aircraft or at an airfield. Examples of various attempts at implementing systems for aiding pilots in landing aircraft during conditions of reduced visibility at an airfield are disclosed in the following patents, the disclosure of each of which is hereby incorporated by reference:

| | |
|---|---|
| 1,936,400 | 4,210,930 |
| 3,510,834 | 4,419,731 |
| 3,643,213 | 4,866,626 |
| 3,671,963 | 4,868,567 |
| 3,952,309 | 5,559,510 |

In view of the above, it would be highly desirable to provide a system which increases the distance at which a runway is visually discernible during weather conditions such as fog, rain and haze, which would otherwise reduce the RVR to a distance which would prevent landing the aircraft.

It would further be desirable to provide a system which is relatively inexpensive and which can be installed relatively quickly at an airfield and on an aircraft, and without major modification to the airfield or aircraft, to aid a pilot in viewing the runway during weather conditions which obscure the pilot's view of the runway, to thereby enable the aircraft to be landed during weather conditions which would otherwise reduce the RVR to a distance preventing the aircraft from being landed at the airfield. It would also be desirable if such a system could be employed without the need for the aircraft to transmit signals, such as electromagnetic signals, which in military applications could make the aircraft electronically detectable by an enemy.

It would further be desirable to provide a system which enables the various runways and taxi areas of an airport or airfield to be illuminated in such a manner as to make each distinguishable from the others, and a means provided for enabling a pilot of an aircraft to discern between one or more runways or taxi areas in conditions of limited visibility.

DISCLOSURE OF INVENTION

The method and apparatus of the present invention relate to an imaging system for aiding the landing of an aircraft during weather conditions which obscure a pilot's view of a runway, and which would otherwise normally prevent the aircraft from being landed on the runway. The apparatus of the present invention generally comprises a plurality of radiant energy sources disposed adjacent a runway of an airfield so as to delineate the runway when the energy sources are energized. A system is employed near the runway for controllably, intermittently energizing each of the radiant energy sources and for sending synchronization signals to an aircraft approaching the runway. The synchronization signals are signals which inform when the radiant energy sources have been energized and also when the energy sources are not being energized.

The present invention also includes an imaging system carried by the aircraft. The imaging system includes a camera, a receiver and a processor. The receiver receives the synchronization signals and transmits them to the processor. The processor uses the synchronization signals to intermittently turn on and off the camera. The camera is mounted on the aircraft in such a position so as to be able to obtain images of the runway as the aircraft approaches the runway. The camera is turned on twice every cycle that the radiant energy sources are energized. The camera takes one frame with the radiant energy sources energized and a second frame after the energy sources are deenergized. The first frame contains radiant energy from the radiant energy sources as well as radiant background energy from sources such as the sun, moon, various light sources on the ground, etc. The second frame includes only the radiant background energy.

The processor subtracts the information in the second frame from the first frame in real time. This results in a filtered image which includes substantially only the radiant energy from the radiant energy sources delineating the runway. Put differently, the objectionable radiant energy background scatter which contributes significantly to obscuring the pilot view of the runway in fog, rain and haze is completely or substantially eliminated in the filtered images. These images are then output to a suitable display which the pilot can view during a landing approach to better visualize the runway. Thus, the operator receives real time, filtered images of the runway in which the radiant energy sources provide a clear delineation of the bounds of the runway.

In the preferred embodiments the radiant energy sources comprise a plurality of light emitting diode (LED) assemblies which are disposed along the runway. Each LED assembly further includes a receiver for receiving radio frequency (RF) signals from a transmitter. The RF signals are used to controllably, intermittently turn on and off the LEDs. The on and off RF signals transmitted by the transmitter are further preferably synchronized with the AC mains power source powering the general purpose airfield lights, such that the pulsing of the LEDs on and off is synchronized with the frequency of the AC mains power source (e.g., 60 Hz in the United States).

The camera employed in the apparatus of the present invention, in one preferred embodiment, comprises a charge coupled device (CCD) camera. This camera also preferably includes an optical bandpass filter centered at the LED center wave length of the LED assemblies.

The filtered images produced on the display of the apparatus significantly improve the runway visual range (RVR) for the pilot of the aircraft. This is because the background radiation (i.e., the objectionable background scatter) is substantially removed by the processor when the radiant background information in each second frame taken by the camera is subtracted from each first frame. The resulting filtered images are displayed on a visual display on board the aircraft. The filtered images provide a more clear, enhanced visual representation of the LEDs delineating the runway to the pilot, thus making it possible to visualize the runway in poor weather conditions at distances which would otherwise not be possible without the apparatus of the present invention. Thus, the present invention enables the operator of the aircraft to land the aircraft during poor weather conditions such as in fog where the RVR would ordinarily be too short, without the assistance of the present invention or some form of instrument landing system, for the operator to land the aircraft.

The method of the present invention involves steps substantially in accordance with the operations described above. Specifically, a plurality of radiant energy sources are controllably intermittently energized. Synchronization signals are then transmitted to the aircraft from a position adjacent the runway, informing when the radiant energy sources have been turned on and when same are also off. The synchronization signals are received by a receiver on the aircraft and a processor uses these signals to controllably turn on and off the camera disposed on the aircraft. The camera is used to obtain a first plurality of images of the runway with the radiant energy sources turned on and a second plurality with the energy sources turned off. The second images are subtracted from the first images to produce real time, filtered images which are displayed in real-time on a visual display on-board the aircraft. In these images, the majority of objectionable background radiation which would ordinarily tend to obscure the pilot's view of the runway and reduce the RVR is removed. In this manner the RVR is increased, thereby aiding the pilot in viewing the runway during a landing approach.

In an alternative preferred embodiment of the present invention, a plurality of independent groups of LED assemblies are disposed along each of a plurality of runways and taxi areas of an airfield or airport. Each group of LED assemblies is pulsed on at a different frequency. The aircraft pilot is instructed from personnel in the control tower which frequency to synchronize the aircraft camera to. When the camera is synchronized with the specified frequency, the LED assemblies associated with that frequency will appear on the visual display on board the aircraft as being continuously illuminated. The other LED assemblies which are synchronized to different frequencies will appear as blinking lights on the visual display. This enables the pilot to quickly discern not only which runway or taxi area he has been assigned to, but also the location of other runways and taxi areas which may be closely adjacent to his designated runway or taxi area. The ability to synchronize the cameras of several different aircraft to different frequencies enables the landing, take-off or taxiing of a plurality of aircraft to be simultaneously coordinated in conditions of limited visibility.

BRIEF DESCRIPTION OF DRAWINGS

The various advantages of the present invention will become apparent to one skilled in the art by reading the following specification and subjoined claims and by referencing the following drawings in which:

FIG. 7 is a timing diagram illustrating the synchronization of three independent groups of LEDs assemblies, which are each synchronized independently with the operation of one of the three cameras, to illustrate how each camera is pulsed on twice for each time its associated group of LED assemblies is pulsed on.

DETAILED DESCRIPTION OF THE PREFERRED EMBODIMENTS

Figure 1:
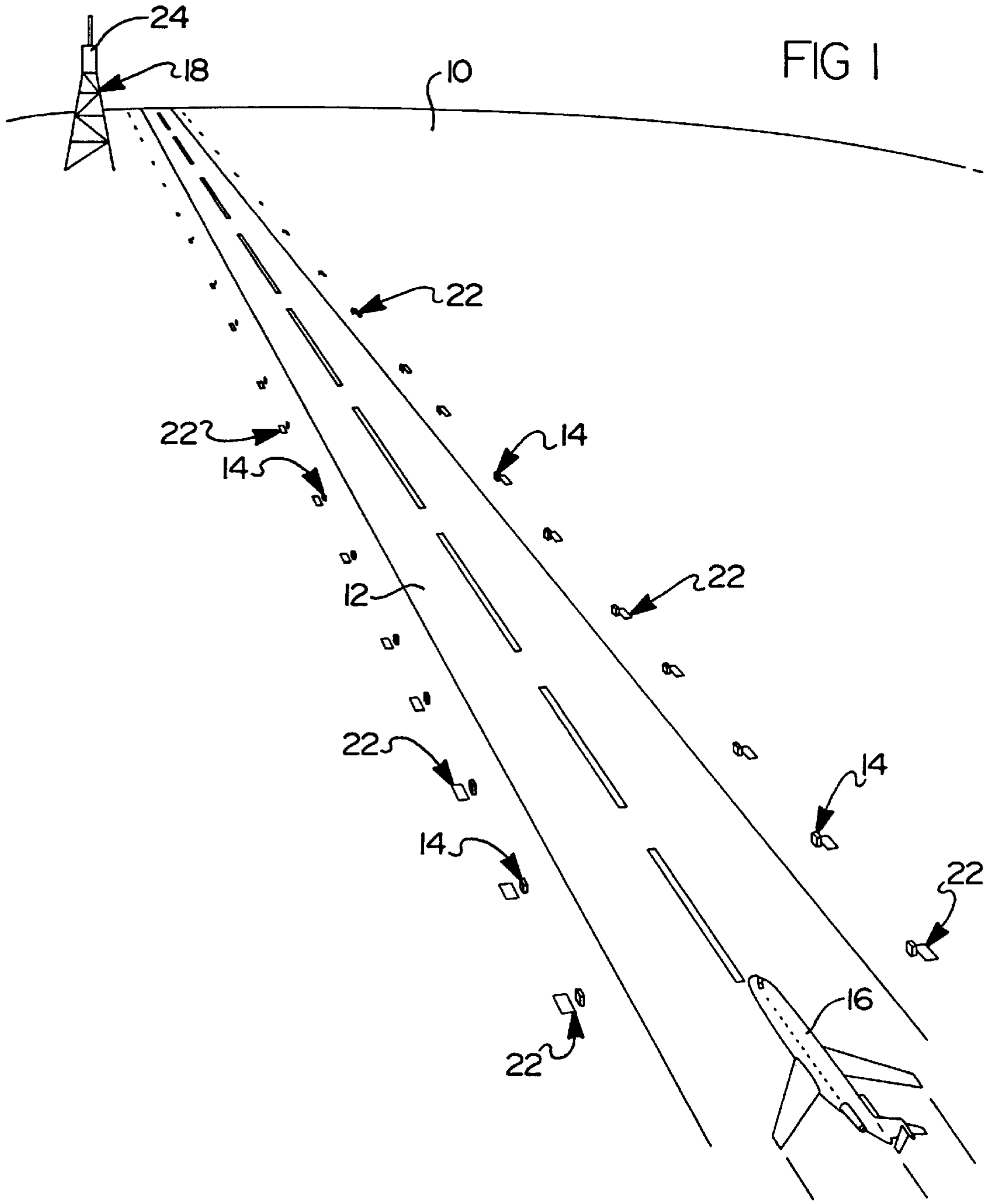
FIG. 1 is a perspective view of an aircraft approaching a runway at an airfield, and illustrating the LED assemblies of the present invention disposed adjacent the runway lamps lining the runway, and also illustrating a tower upon which a transmitter is disposed at the end of the runway for transmitting synchronization signals to apparatus of the present invention carried on the approaching aircraft.

Referring to FIG. 1, there is shown an airfield 10 having a runway 12 which is delineated by a plurality of spaced apart runway lamps 14 disposed on opposite sides of the runway. During reasonable weather conditions (i.e., no significant fog, rain or haze), the runway lights 14 are normally sufficient to permit a pilot of an aircraft 16 approaching the runway 12 during landing to clearly discern the runway 12. During weather conditions involving fog, rain or haze, however, the light from the runway lamps 14 may be obscured to such a degree that the pilot is not able to clearly discern the runway 12.

Figure 2:
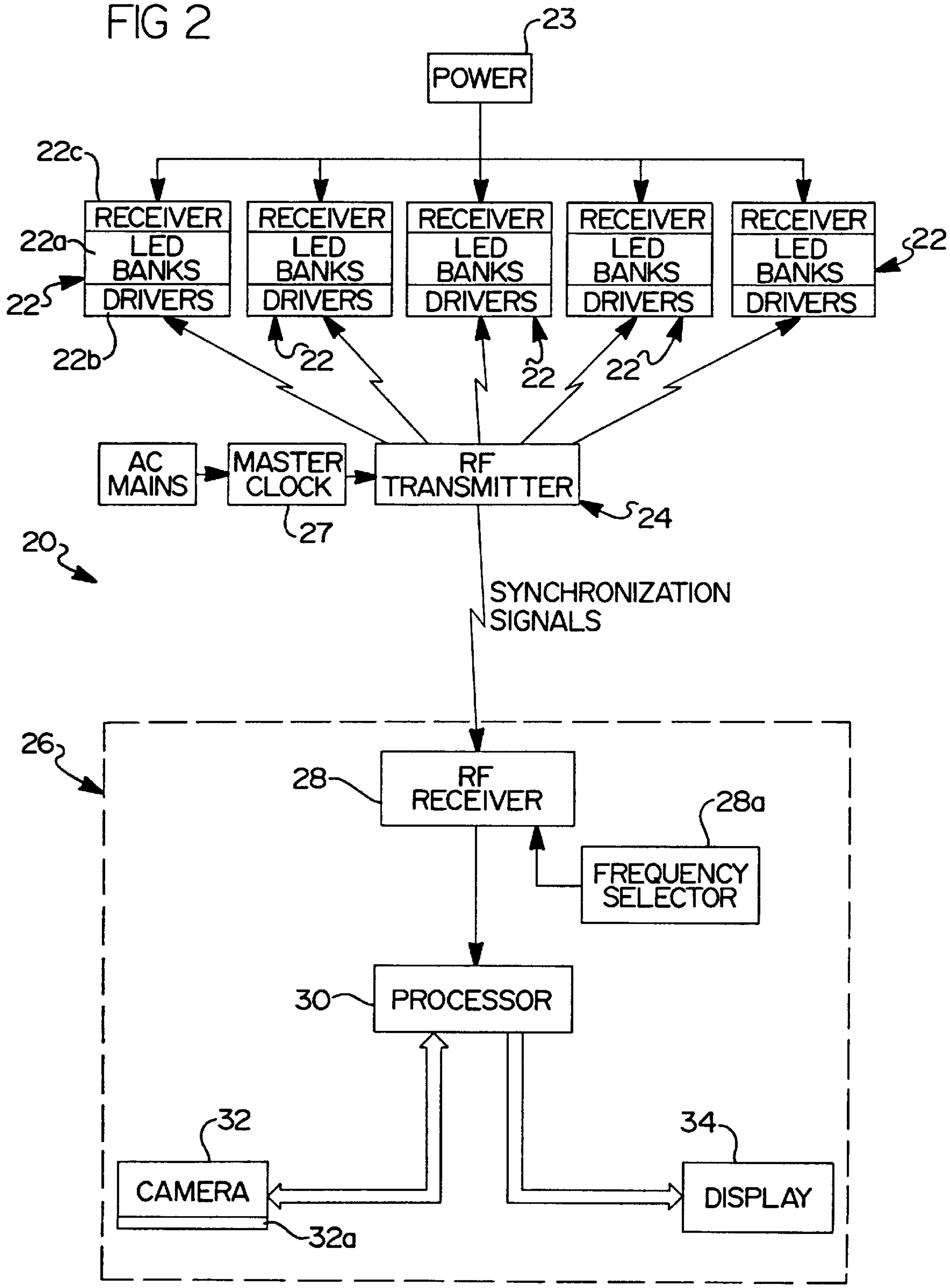
FIG. 2 is a simplified block diagram of the major components of the present invention.

Referring now to FIG. 2, an apparatus 20 in accordance with the present invention is shown. The apparatus 20 forms an imaging system to aid in delineating the runway 12 for a pilot of an aircraft during weather conditions such as fog, rain, haze, etc. which impair a pilot's view of the runway 12. The apparatus 20 generally comprises a plurality of LED assemblies 22, a radio frequency (RF) transmitter 24 and an imaging system 26. The LED assemblies 22 are each powered by a power source 23 supplying power to each of the runway lamps 14, as will be explained further momentarily. AC mains power is also applied to a master clock 27, which in turn is used to control the application of power to the RF transmitter. The imaging system 26 comprises a radio frequency receiver 28, a processor system 30, a camera 32 and a display 34, and is carried on board the aircraft 16. Frequency selector **28*a* is used only in accordance with the embodiment of FIG. 5, described hereinafter, and is not necessary for the operation of the apparatus 20**.

With brief reference again to FIG. 1, the RF transmitter 24 is preferably disposed on a tower 18 near the end of the runway 12. In this manner the signals from the RF transmitter 24 reach the approaching aircraft 16 at substantially the same time as the radiation from the sources 22, because both travel at the speed of light.

Figure 3:
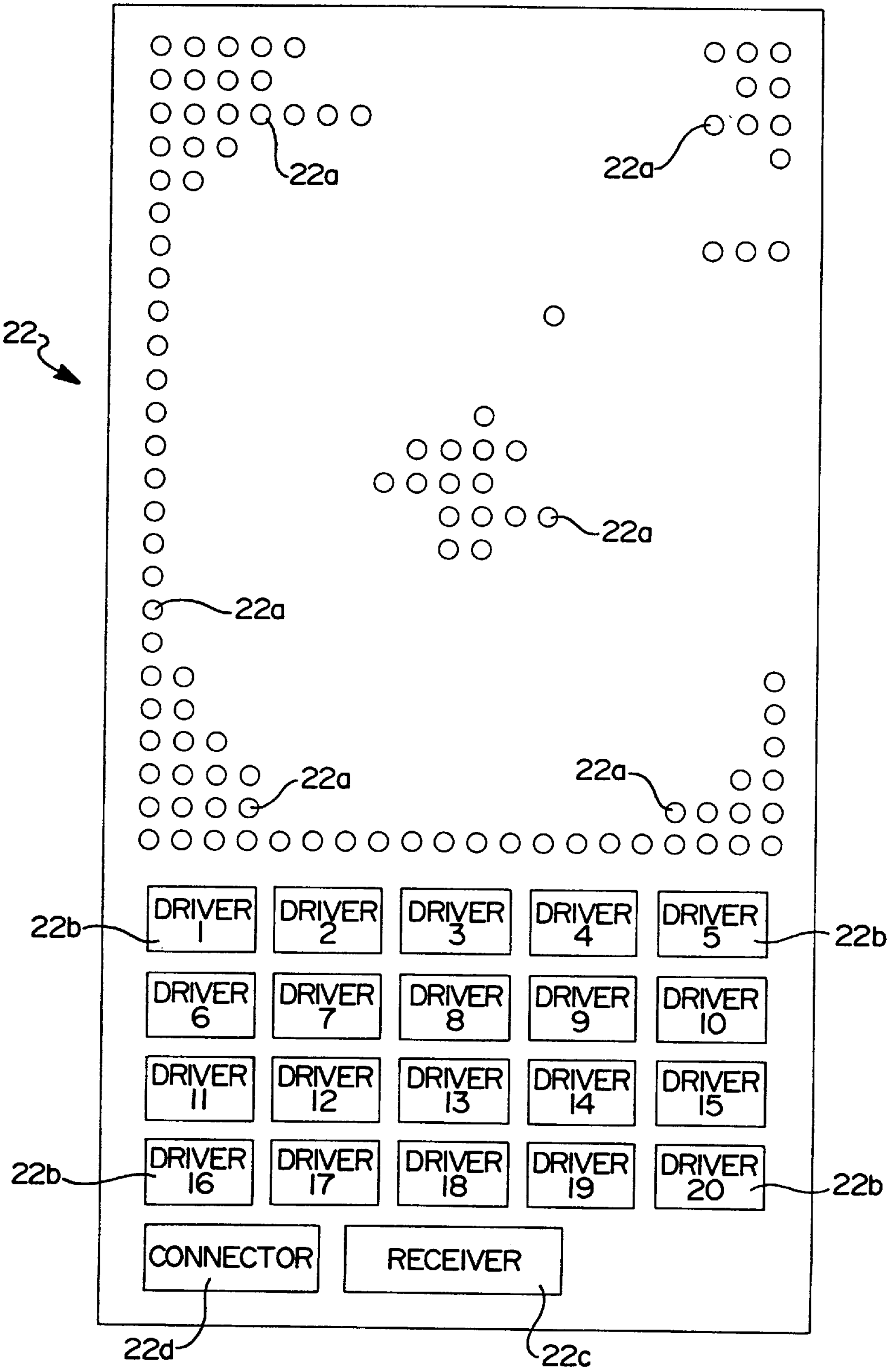
FIG. 3 is a simplified illustration of one LED assembly.

Referring to FIGS. 2 and 3, each of the LED assemblies 22 comprises a plurality of LEDs **22*a*, a current driver circuit 22*b*for driving the LEDs 22*a*, a radio frequency receiver 22*c*, and a connector 22*d* (shown only in FIG. 3) for coupling the assembly to the power source 23. The radio frequency receiver 22*c* generates signals for controlling the driver circuit 22*b* to cause the driver circuit 22*b* to controllably, intermittently energize the LEDs 22*a*. In practice, the number of LEDs 22*a* associated with each assembly 22 can vary widely, but in the preferred embodiment shown in FIG. 3 comprises preferably about 20 rows of 25 LEDs for a total of 500 LEDs for each assembly 22. The beam spread of each assembly 22 is approximately 17°×17° and each assembly 22 consumes about 200W of power to operate. It will be appreciated, however, that a greater or lesser number of LEDs 22*a* could be included in each assembly 22, which will in turn vary the power requirements of each LED assembly 22. Preferably a sufficient number of LED assemblies 22 is implemented to clearly delineate the runway 12. In most instances, it is anticipated that around 100 LED assemblies 22 will be sufficient to clearly delineate virtually any runway. Of course, a greater or less number of LED assemblies 22** could be employed if desired, limited only by the power requirements needed to power the total number of LED assemblies being used.

With further reference to FIG. 2, the RF transmitter 24 generates radio frequency signals to the receivers **22*c* of each LED assembly 22 to cause each driver circuit 22*b* to turn on or energize the LEDs 22*a* for a predetermined time. The radio frequency signals from the RF transmitter 24 have a carrier frequency chosen to propagate through fog and function as synchronizing signals to controllably pulse the LEDs 22*a* on for brief, predetermined time durations. Preferably, the LEDs 22*a* are pulsed synchronously about 15 times per second, with each pulse width having a time duration of about 13.3 ms. The LEDs 22*a*** further have a center wave length of preferably about 875 nm.

Figure 4:
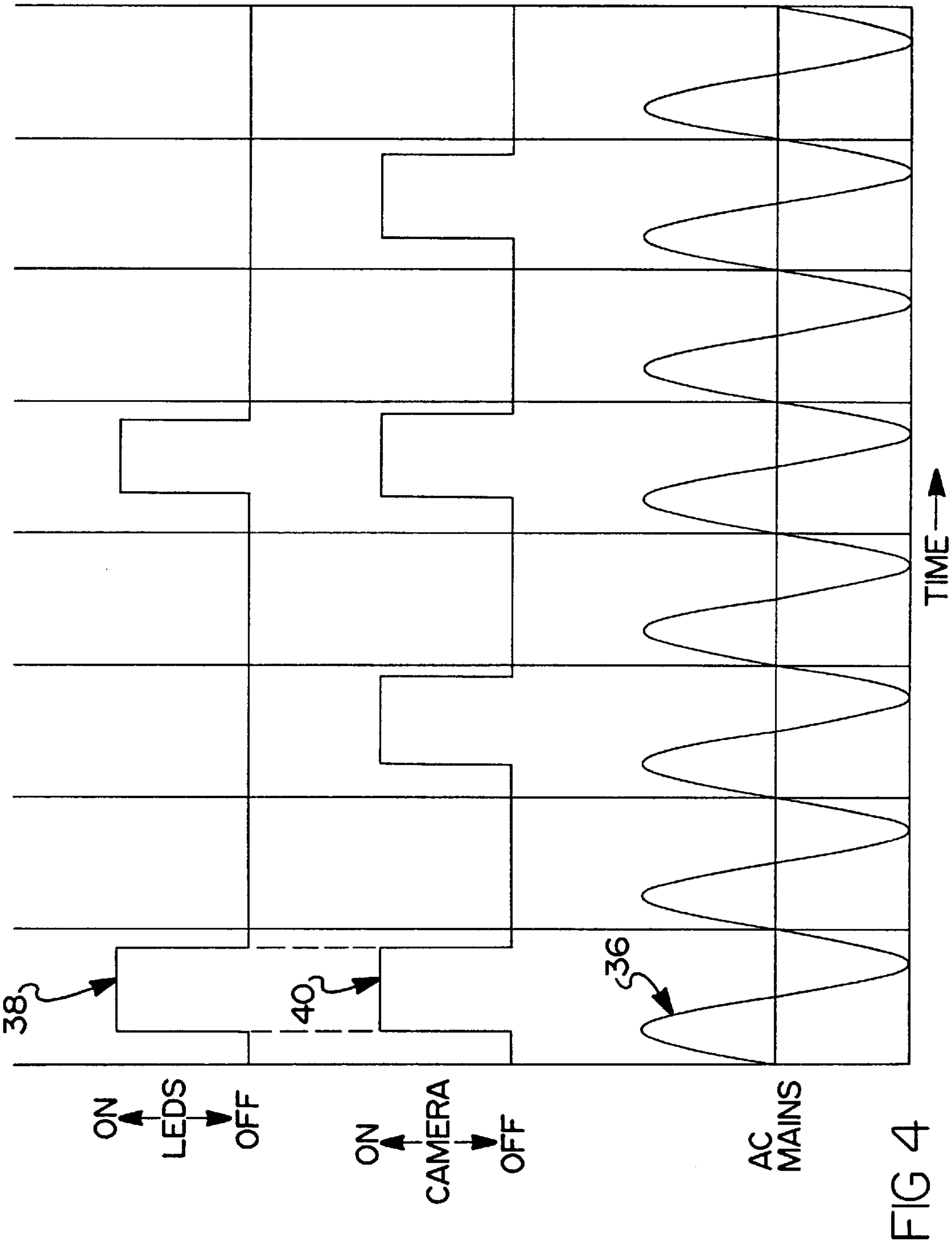
FIG. 4 is a timing diagram illustrating how the "on" times of the LED assemblies and the operation of the camera are synchronized with the AC mains alternating current signal.

With brief reference to FIG. 4, the energization of the LEDs **22*a* and also the camera 32 (FIG. 2) are further synchronized with the AC mains voltage. The AC mains voltage is represented by waveform 36. Waveform 38 represents the energization of each one of the LEDs 22*a* and waveform 40 represents the operation of the camera 32. The operation of the camera 32 and the LEDs 22*a* are synchronized such that the camera 32 is turned on by the synchronization signals transmitted from RF transmitter 24 every time the LEDs 22*a* are pulsed on. Preferably, the camera 32 is turned on for a time duration just slightly longer than that during which the LEDs 22 are energized. Each time the camera 32 is turned on it records a "frame". The first frame includes radiant energy from the LEDs 22*a* as well as radiant background energy from various sources besides the LEDs 22*a* such as arc lamps, incandescent lamps, fluorescent lamps, and other light sources on the ground. It will be appreciated that these just-mentioned sources have a DC component, and one at twice the power line frequency ($2f_p$) plus harmonics. The second frame taken by the camera 32 occurs when the LEDs 22*a* are turned off. The third frame is again taken with the LEDs 22*a* turned on, the fourth frame with the LEDs 22*a* turned off, and so forth. Thus, the camera 32 obtains a pair of frames, one including the LEDs 22*a* turned on and one including the LEDs 22*a*** turned off, approximately 15 times per second.

With further reference to FIG. 1, the LED assemblies 22 are preferably disposed closely adjacent the runway lamps 14 so as to be powered from the same power source powering the lamps 14. Obviously, the larger the number of LEDs 22*a* incorporated in each LED assembly 22 the greater the power requirements. It is anticipated that in most instances sufficient power will be available from the sources powering the lamps 14. Depending upon how the LED assemblies 22 are packaged, the assemblies 22 may require some form of active cooling such as a low power cooling fan or a thermoelectric cooler. If a thermoelectric cooler is needed for each LED assembly 22, it will be appreciated that significant additional power will likely be required.

Figure 5:
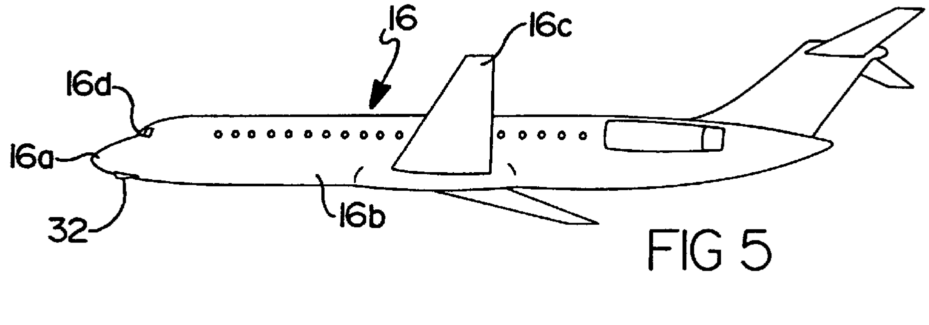
FIG. 5 is a fragmentary view of a front portion of an aircraft illustrating where the camera of the present invention could be located on the aircraft fuselage.

With brief reference to FIG. 5, the camera 32 is shown mounted below the nose 16*a* of the aircraft 16. It will be appreciated, however, that the camera 32 could be mounted in a variety of other positions either along the fuselage 16*b* of the aircraft 16, on a wing 16*c*, on the landing gear (not shown) of the aircraft 16, or possibly even within the cockpit 16*d* of the aircraft. The important consideration is that the positioning of the camera 32 and the camera 32 field-of-view (FOV) permit the imaging of the runway 12, allowing for typical aircraft pitch and yaw deviations during landing. The requisite FOV depends on the aircraft, but is typically about 30°.

With further reference to FIGS. 1 and 2, as the aircraft 16 approaches the runway 12, the RF transmitter 24 transmits the synchronization signals to the RF receiver 28 on board the aircraft 16. These signals are output to the processor 30 which controls the camera 32. The camera 32 is based on a progressive scan, interline transfer charge coupled device (CCD) of one inch format (13.2 mm diagonal), which is a standard format CCD. Interline transfer is preferable to frame transfer because the latter is susceptible to "smear" in the presence of bright sources. The lens of the camera 32 provides a horizontal field of view (FOV) of about 30°, compatible with present day standard heads up display (HUD) display systems. A bandpass filter 32*a* centered at the LED center wave length of the LEDs 22*a* is included in the optics of the camera 32. This enables the camera 32 to reject most of the radiant background information immediately adjacent the LED assemblies 22. The bandwidth of the filter 32*a* is preferably just sufficient to pass most of the LED radiation, accounting for product variation and temperature dependence.

As mentioned previously, the camera 32 takes about 30 frames per second and is preferably equipped with correlated double sampling yielding baseline read out noise equal to about 20 electrons per read. It will be appreciated that this value is conservative, since some existing cameras provide fewer than 10 electrons read noise at this frame rate. Ideally, the camera 32 also includes a controllable integration time adjusted to correspond to about 13.3 ms per frame, and adjusted to occur at the arrival time of the pulses emitted by the LEDs 22*a*. The timing is not critical because the emitted pulse width of about 13.3 ms permits plus/minus 500 microsecond timing variation with negligible performance degradation. The camera 32 also preferably has an f/1. lens. The CCD of the camera 32 has a non-square pixel configuration of 760 horizontal×480 vertical.

The images or frames captured by the camera 32 are transmitted back to the processor 30 which subtracts the digital information comprising the second frame pixel-by-pixel from the digital information comprising the first frame. Thus, every frame taken with the LEDs 22*a* off is subtracted from the previous frame taken with the LEDs 22*a* turned on. Thus, the radiant background information captured in each frame while the LEDs 22*a* are off is subtracted from the previous frame taken while the LEDs 22*a* were turned on, and the resulting filtered image is output to the display 34. A processor suitable for performing this function is generally commercially known as a "frame grabber" and is available from various sources such as Imagraph of Chelmsford, Mass, Datacube, Inc., Danvers, Mass; and DIPIX Technologies Inc., Ottawa, Ontario, Canada. The display may comprise a cathode ray tube, a flat panel display, or possibly a heads- up display (HUD) system.

In analyzing the performance of the apparatus 20 in increasing the RVR, a total of 500 LEDs were assumed to be pulsed simultaneously. A single LED intensity of 0.75 W $sr^{-1}$ was used to compute the total intensity in photons, which equals $1.65 \times 10^{21}$ $photons^{-1}s^{-1}sr^{-1}$. For the 13.3 ms pulse width, this yields an integrated intensity of $2.20 \times 10^{19}$ photons $sr^{-1}$ per pulse. The camera 32 was assumed to have an f/1 lens taken to be lossless. A 0.25 quantum efficiency was assumed together with a read noise of 20 electrons. A 0.2 second human eye integration time was also assumed during which time there would be three LED pulses. This was accounted for by multiplying the single pulse, single pixel SNR by $\sqrt{3}$. In addition, it was further assumed that there would be 100 LED assemblies 22 per landing field, each assembly imaged on one CCD pixel of the camera 32 with no two assemblies on the same pixel. The human eye is particularly attuned to discerning patterns of the type produced by the set of LED assemblies 22*a*. This was taken into account by multiplying the single pixel SNR by $\sqrt{100}=10$.

It should also be remembered that the RVR depends on the time of day. For a given fog extinction coefficient there is an RVR for a particular daylight condition and a greater one for night. The background radiance determines the maximum camera aperture that gives reasonable dynamic range. This radiance also determines the amount of statistical background noise. For the night case, starlight plus ¼ moon was assumed which permits a wide open aperture. For the day case it was assumed that the sun is at an angle of 75° below the zenith (i.e., exactly overhead). This corresponds to 7 a.m. and 5 p.m. at the equator during the equinoxes. The following table gives the approximate range for the apparatus 10 having 100 LED assemblies 22 having a system SNR=1, to illustrate the improvement in the RVR during both day and night times.

| | Day | | | Night | | |
|---|---|---|---|---|---|---|
| RVR | 500 ft. | 700 ft. | 1100 ft. | 500 ft. | 700 ft. | 1100 ft. |
| | 152.5 m | 213.5 m | 335.5 m | 152.5 m | 213.5 m | 335.5 m |
| Range | 1800 ft. | 2600 ft. | 4700 ft. | 960 ft. | 1400 ft. | 2200 ft. |
| | 549 m | 793 m | 1433.5 m | 292.8 m | 427 m | 671 m |

From the above table, it will be appreciated that a category IIIa day condition (RVR=700 feet=213.5 m) results in imaging at a range of about 2600 feet (793 m). The category IIIa night condition results in imaging at a range of 1400 feet (427 m), short of the worst case category I lower limit of 1800 feet (549 m) but greater than the 1200 foot (366 m) lower limit of a category II condition. Visualization during a category IIIb condition (i.e., RVR between 300–699 feet or 91.5–213.2 m) is improved to that of a category I day condition (i.e., 1800 feet or 549 m) and well up into the RVR range for a category IIIa condition for the night case (i.e., within a range of 700–1199 feet, or 213.5–365.7 m). The RVR during all category II conditions is translated well up into the RVR range for category I conditions for both day and night.

It will be appreciated that various other components could be substituted for those described herein. For example, diode lasers could be substituted where the LEDs 22*a* and used in connection with an intensified CCD camera with a narrow band filter. For the diode laser implementation, a Gen III intensifier would be used. Thus, the diode lasers would not be in an eye safe region. However, intensifiers for the eye safe region are currently under development and it is anticipated that these may be commercially available within a relatively short period of time. It is also possible that a plurality of flash lamps might be feasible as the radiant energy source in place of the LEDs. Still further, it is possible that millimeter wave sensing and imaging technology might also be employed as substitutes for the LEDs and camera. In fact, the principles of the apparatus and method of the present invention are applicable to the entire electromagnetic spectrum.

The apparatus and method of the present invention are also particularly attractive in military operations where the aircraft must land on an aircraft carrier. The apparatus and method of the present invention maintains the covertness of the aircraft, as well as the aircraft carrier, because the radio frequency signal transmitted by the transmitter 24 need only be on occasionally to synchronize the camera clock with the master clock. Thus, no radio frequency signals need to be transmitted from the aircraft, which might make the aircraft more susceptible to detection.

The apparatus and method of the present invention thus increase the runway visual range (RVR) during poor weather conditions such as fog, haze, rain, etc. without requiring expensive category III instrumentation to be installed on the aircraft as well as at an airport at which the aircraft is landing. The various components of the present invention, such as the imaging system 26, are readily installed on the aircraft without major modifications to the aircraft. The LED assemblies 22 and RF transmitter 24 are further easily installed in an airfield provided power is available near the runway lamps lining the runway of the airfield.

Figure 6:
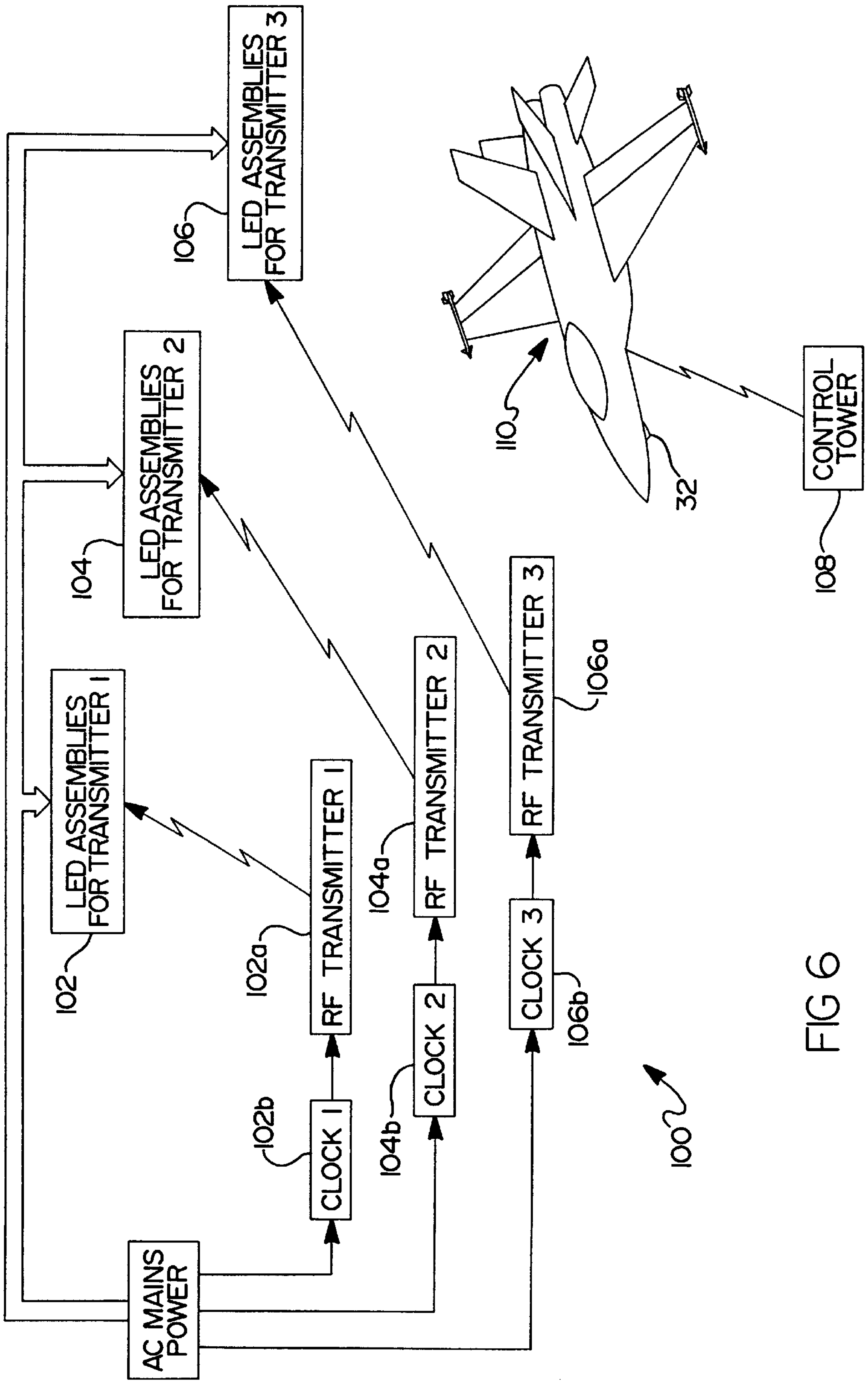
FIG. 6 is a simplified block diagram of an alternative preferred embodiment of the present invention incorporating several independent groups of LED assemblies for designating several different portions of an airport or airfield, and the electronics associated with each group of LED assemblies.
Figure 7:
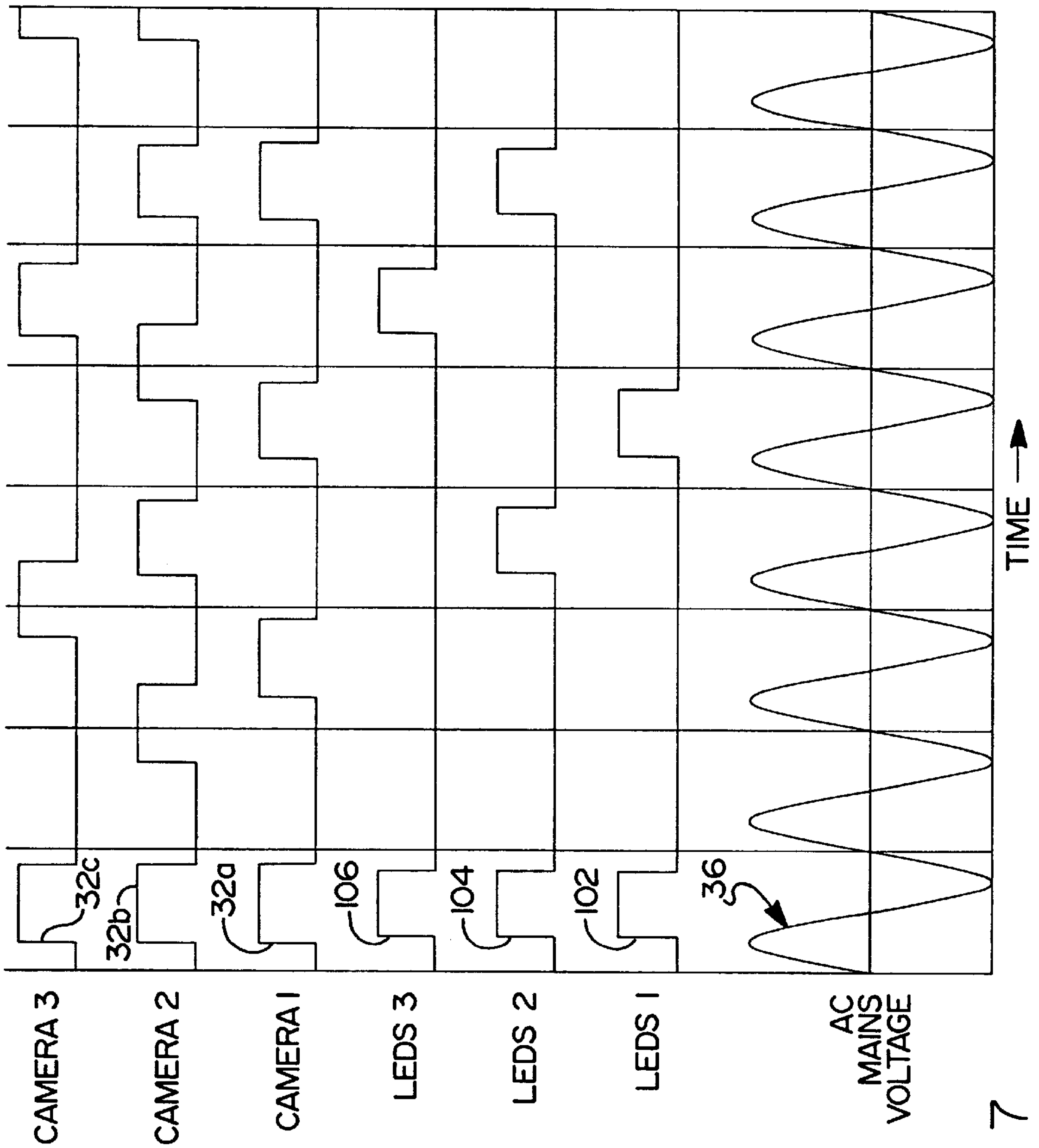

Referring now to FIGS. 6 and 7, an alternative preferred embodiment 100 of the present invention is illustrated. Referring specifically to FIG. 6, this embodiment comprises a plurality of groups of LED assemblies 102–106. Each group includes a plurality of LED assemblies identical to LED assembly 22 shown in FIGS. 2 and 3. While each LED assembly group 102–106 is shown as receiving power from an AC mains power source, it will be appreciated that these assemblies can also be powered from a separate DC power supply.

Operation of LED assembly group 102 is controlled by RF transmitter 102*a*, LED assembly group 104 is controlled by RF transmitter 104*a*, and LED assembly group 106 is controlled by RF transmitter 106*a*. Each of the RF transmitters 102*a*–106*a* is identical in construction to transmitter 24 shown in FIG. 2. Operation transmitter 102*a* is synchronized with the frequency of clock 102*b*. Operation of transmitter 104*a* is likewise synchronized with the frequency of a second clock 104*b*, and the operation of RF transmitter 106*a* is synchronized with the frequency of the clock signal from clock 106*b*. Each of the clocks 102*b*–106*b* is further powered by the AC mains power source or alternatively by a DC power source.

As an example, LED assembly group 102 may have its LED assemblies arranged along a first runway at an airport or airfield, LED assembly group 104 may have its LED assemblies arranged along a second runway, and LED assembly group 106 may have its LED assemblies arranged to designate a taxiing area adjacent one or both of the runways. In fact, any area of the airport or airfield which the aircraft pilot will need to see clearly during operation of the aircraft can be demarcated with an independent group of LED assemblies provided an independent RF transmitter and an independent clock are associated therewith. While three groups of LED assemblies have been shown in FIG. 6 and described in connection with this example, it will be appreciated that a greater or lesser plurality of groups of LED assemblies could easily be incorporated at an airfield or airport.

Initially, personnel at a control tower 108 of the airport or airfield send a radio frequency message to the aircraft pilot informing the pilot of the frequency the imaging system 26 carried on board the aircraft 110 needs to be synchronized to. The operator of the aircraft 110 selects this frequency via selector 28*a* which tunes the RF receiver 28 shown in FIG. 2 to the desired frequency. Once the on-board imaging system 26 has been set to the desired frequency, operation of the camera 32 of the aircraft 110 will be synchronized with the selected frequency.

As an example, if the camera 32 is synchronized with the operation of clock 102*b* in FIG. 6, then the camera 32 will be synchronized with the operation of LED assembly group 102. RF transmitter 102*a* will pulse "on" each of the LED assemblies of LED assembly group 102 in accordance with the frequency of clock 102*b*. The camera 32 of the aircraft 110 will be turned on by the processor 30 (FIG. 2) once while the LED assembly group 102 is turned on and once while they are turned off. Thus, two images will be obtained for every cycle of operation of the LED assembly group 102. To the pilot of the aircraft 110, the LED assemblies of LED assembly group 102 appear as being turned on continuously. LED assembly group 104 and 106, being pulsed on at different frequencies by clocks 104*b* and 106*b*, will appear as blinking groups of lights to the pilot. Thus, the pilot is able to readily discern other areas of the airport or airfield which may lie adjacent to the runway which he has been designated. Similarly, if the pilot is instructed from the control tower 108 to select the frequency of clock 104*b*, then the group of LED assemblies 104 will appear as being continuously illuminated while LED assembly groups 102 and 106 will appear as blinking groups of lights.

The synchronization of each of LED assembly groups 102, 104 and 106 with three associated cameras 32*a*–32*c* is illustrated in FIG. 7. In this timing diagram it will be noted that the operation of camera 32*a* is synchronized with LED assembly group 102, camera 32*b* is synchronized with LED assembly group 104 and camera 32*c* is synchronized with LED assembly group 106. Each of cameras 32*a*, 32*b* and 32*c* may be associated with its own aircraft or, alternatively, a single aircraft could carry more than one camera and an associated on-board imaging system 26. It should be noted that camera 32*a* is pulsed on twice for every cycle of LED assembly group 102: once when LED assembly group 102 is turned on and once when it is turned off. Camera 32*b* is likewise turned on twice for every cycle of operation of LED assembly group 104, and camera 32*c* is likewise turned on twice for every cycle of LED assembly group 106.

It will also be appreciated that in the embodiment FIG. 6, it will not be possible to synchronize the turn on time of each group of LED assemblies 102–106 with the AC mains voltage represented by waveform 36. Accordingly, a slightly lesser degree of resolution of the resulting image may in some instances result. However, the LED assemblies associated with that portion of the airport or airfield which, from previous experience, has proven to be the most difficult area of the airport or airfield to visualize during poor weather conditions, could be synchronized with the AC mains voltage. This will insure that the on-board imaging system 26 is able to obtain the clearest visual image for that portion of the airport or airfield which usually is the most difficult to visualize in poor weather conditions.

As will also be appreciated, the system 100 shown in FIG. 6 provides the ability to assist the pilot in not only landing the aircraft but also taxiing to a designated gate or area of the airport once the aircraft has landed. This is accomplished simply by personnel in the control tower 108 notifying the pilot to select the frequency of the RF transmitter controlling LED assembly group which delineates the appropriate taxiing area.

It will be appreciated that the various embodiments described herein have wide applicability in both land-based and marine applications. For example, the LED assemblies could be placed on buoys at sea, provided of course that they have a self-contained power source. Such an arrangement could significantly assist poor weather and night time landings of aircraft on aircraft carriers or landings on runways which are closely adjacent water.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method for increasing visibility of areas of an airport or airfield to aid an operator of an aircraft in visualizing said areas during weather conditions which obscure the operator's vision of said areas, the method comprising the steps of:

disposing a first plurality of radiant energy sources adjacent a first area of said airport or airfield;

disposing a second plurality of radiant energy sources adjacent a second area of said airport or airfield;

controllably turning on and off said first plurality of radiant energy sources;

controllably turning on and off said second plurality of radiant energy sources;

using a camera placed on said aircraft to obtain images of said pluralities of radiant energy sources;

synchronizing operation of said camera to a selected one of said pluralities of radiant energy sources to obtain at least one image while said selected plurality of radiant energy sources is turned off and at least one image while said selected plurality of radiant energy sources is turned on; and subtracting said image obtained while said selected plurality of radiant energy sources is turned off from the image obtained while said selected plurality of radiant energy sources is turned on, in real time, to produce a filtered image which provides said operator with an enhanced visual representation of said selected plurality of radiant energy sources to thereby assist said operator in visually discerning an area adjacent said selected plurality of radiant energy sources.

2. An apparatus for increasing a runway visual range (RVR) to aid an operator of an aircraft in visualizing a runway upon a landing approach during weather conditions obscuring the operator's view of said runway, said apparatus comprising:

a plurality of light emitting diode (LED) assemblies disposed along opposite sides of said runway, each said LED assembly including at least one LED, an LED driver circuit and a radio frequency receiver, each one of said LED assemblies operating to help delineate an outline of said runway when said LEDs are energized;

a radio frequency transmitter disposed adjacent said runway for providing a radio frequency signal synchronized with an AC power signal powering said LEDs which is received by said radio frequency receiver of each one of said LED assemblies to cause said LED of each one of said assemblies to be energized intermittently in synchronization with the frequency of said AC power signal provided to said LED assemblies, said radio frequency transmitter further transmitting radio frequency synchronization signals indicating when said LEDs are energized and when said LEDs are not energized;

an imaging system disposed on said aircraft, said imaging system comprising:

a radio frequency receiver for receiving said radio frequency synchronization signals and transmitting control signals in response thereto;

a camera mounted on said aircraft so as to be able to obtain an image of said runway as said aircraft approaches said runway;

a processor assembly responsive to said control signals for controlling said camera in accordance with said radio frequency synchronization signals such that said camera obtains a plurality of first images when said LEDs are energized and a plurality of second images when said LEDs are not energized;

said processor operating to subtract said second plurality of images from said first plurality of images to produce a plurality of filtered images representing enhanced visual images of said LEDs delineating said runway; and a display for presenting said filtered images to said operator of said aircraft as said operator approaches said runway during a landing approach.

3. The apparatus of claim 2, wherein:

said camera comprises a charged coupled device (CCD) camera including a bandpass filter centered at a center wave length of said LEDs.

4. An apparatus for increasing the runway visual range (RVR) to aid an operator of an aircraft in visualizing areas of an airport or airfield during poor visibility weather conditions:

a first plurality of radiant energy sources disposed adjacent a first area of said airport or airfield;

a second plurality of radiant energy sources disposed adjacent a second area of said airport or airfield;

a first system for turning on and off said first plurality of radiant energy sources at a first frequency;

a second system for turning on and off said second plurality of radiant energy sources at a second frequency different from said first frequency;

an imaging system carried on board said aircraft, said imaging system including:

a camera mounted on said aircraft;

a processor for controlling operation of said camera and for processing images obtained by said camera;

a selector for enabling said operator to synchronize operation of said camera with one or the other of said pluralities of radiant energy sources; and said camera operating to capture radiant energy images, in real time, from the selected plurality of radiant energy sources, said processor operating to control said camera to capture at least one radiant energy image of said selected plurality of radiant energy sources when said selected plurality of radiant energy sources is turned on, and at least one radiant energy image when said selected plurality of radiant energy sources is turned off, and to subtract said image obtained while said selected plurality of radiant energy sources is turned off from the image obtained while said selected plurality is turned on, to thereby produce a filtered radiant energy image providing an enhanced visual representation of said selected group of radiant energy sources.

5. The apparatus of claim 4, wherein said first system for turning on said first plurality of radiant energy sources comprises a first radio frequency transmitter; and wherein said second system for turning on said second plurality of radiant energy sources comprises a second radio frequency transmitter.

6. The apparatus of claim 5, further comprising a first clock for controlling said first radio frequency transmitter in accordance with said first frequency; and a second clock for controlling said second radio frequency transmitter in accordance with said second frequency.

7. The apparatus of claim 6, wherein said first system for turning on said first plurality of radio frequency transmitters operates to generate a radio frequency turn on signal which is transmitted simultaneously in real-time to said first plurality of radiant energy sources and to said imaging system of said aircraft; and wherein said second system for turning on said second plurality of radio frequency transmitters operates to generate a radio frequency turn on signal which is transmitted simultaneously in real-time to said second plurality of radiant energy sources and to said imaging system of said aircraft.

8. A method for increasing a runway visual range (RVR) to aid an operator of an aircraft in visualizing a runway upon a landing approach during weather conditions obscuring the operator's view of said runway, said method comprising the steps of:

disposing a plurality of radiant energy sources adjacent said runway;

controllably intermittently energizing said radiant energy sources;

using a camera placed on said aircraft to capture a plurality of first images of said runway taken when said radiant energy sources are energized and a plurality of second images of said runway taken when said radiant energy sources are not energized; and subtracting said second images from said first images to produce a plurality of filtered images, said filtered images comprising an enhanced representation of said radiant energy sources thereby serving to delineate said runway for said operator and improve said RVR despite said weather conditions.

9. The method of claim 8, further comprising the steps of:

disposing a radio frequency receiver on board said aircraft;

transmitting a radio frequency signal from a transmitter disposed adjacent said runway when said radiant energy sources are energized to synchronize said camera with the energization of said radiant energy sources such that said camera alternatively captures said first and second images.

10. The method of claim 8, wherein the step of subtracting said second images from said first images comprises using a processor to produce said filtered images.

11. The method of claim 8, wherein the energization of said radiant energy sources is synchronized with a frequency of an AC power source powering said radiant energy sources.

12. An apparatus for increasing the runway visual range (RVR) to aid an operator of an aircraft in visualizing a runway upon a landing approach during poor visibility weather conditions, said apparatus comprising:

at least one radiant energy source disposed in the vicinity of said runway for generating radiant energy signals;

a radiant energy receiver carried on board said aircraft for capturing said radiant energy signals as said aircraft approaches said runway during a landing approach, and for capturing radiant energy background signals when said radiant energy source is turned off; and a processor carried on board said aircraft for subtracting said radiant energy background signals from said radiant energy signals, in real time, to produce a plurality of filtered images providing an enhanced visual representation of said radiant energy source delineating said runway to increase the RVR of said runway for said operator.

13. The apparatus of claim 12, further comprising a system for intermittently turning on and off said radiant energy source in synchronization with a frequency of an AC power source powering said radiant energy source.

14. The apparatus of claim 13, wherein said system further includes a transmitter for transmitting synchronization signals to said aircraft indicating when said radiant energy source is turned on and when said source is turned off; and wherein said apparatus further includes a receiver for receiving said synchronization signals and outputting signals to said processor to inform said processor when said radiant energy source is turned on and off.

15. The apparatus of claim 12, further comprising a display for displaying said filtered images to said operator.

16. The apparatus of claim 12, further comprising a plurality of groups of radiant energy sources; and a system for turning on and off each of said groups of radiant energy sources at different frequencies.

17. The apparatus of claim 16, wherein said radiant energy receiver on-board said aircraft is synchronized with the operation of only one of said groups of radiant energy sources.

18. An apparatus for increasing a runway visual range (RVR) to aid an Operator of an aircraft in visualizing a runway upon a landing approach during weather conditions obscuring the operator's view of the runway, said apparatus comprising:

a radiant energy source disposed adjacent said runway so as to at least partially delineate said runway for generating a radiant energy signal;

a transmitting system for controllably energizing said radiant energy source to cause said radiant energy source to be pulsed on and off and for transmitting a synchronizing signal indicating that said radiant energy source has been pulsed on;

a radiant energy receiver disposed on said aircraft so as to be able to receive said radiant energy signals as said aircraft approaches said runway;

a signal receiver responsive to said synchronizing signal for turning on said radiant energy receiver intermittently to obtain pluralities of first and second images, said first images being obtained when said radiant energy source is being energized and including said radiant energy signals and radiant background information, and said second images being obtained when said radiant energy source is not being energized and including only said radiant background information;

a system for subtracting said plurality of second images from said plurality of first images to form a plurality of filtered images in which said radiant background information has been removed, said filtered images representing substantially only radiant energy from said radiant energy source and serving to provide an enhanced visual delineation of said runway; and a display viewable by said operator of said aircraft for displaying said filtered images delineating said runway as said aircraft approaches said runway during a landing approach.

19. The apparatus of claim 18, wherein said system for subtracting said second images from said first images comprises a processor carried on said aircraft.

20. The apparatus of claim 18, wherein said display comprises a heads-up-display (HUD).

21. The apparatus of claim 18, wherein said system for controllably energizing said radiant energy source comprises a radio frequency transmitter; and wherein said radiant energy source includes a radio frequency receiver responsive to said radio frequency transmitter for turning on and off said radiant energy source; and wherein said radio frequency transmitter operates to transmit said synchronizing signal.

22. The apparatus of claim 18, wherein said radiant energy source comprises a plurality of light emitting diodes (LEDs) disposed along said runway so as to define the bounds of said runway.

23. The apparatus of claim 18, wherein said radiant energy receiver comprises a camera.

24. The apparatus of claim 23, wherein said camera comprises a charge coupled device (CCD) camera having an optical bandpass filter; and wherein said radiant energy source comprises a plurality of light emitting diodes (LEDs); and wherein said bandpass filter is centered at the center wave length of an optical signal provided by said LEDs.

25. An apparatus for increasing a runway visual range (RVR) to aid an operator of an aircraft in visualizing a runway upon a landing approach during weather conditions obscuring the operator's view of said runway, said apparatus comprising:

a plurality of light emitting diode (LED) assemblies disposed along said runway so as to delineate the bounds of said runway, each one of said LED assemblies including a plurality of light emitting diodes (LEDs) and a radio frequency receiver operable to energize said LEDs upon receipt of a first radio frequency signal;

a radio frequency transmitter disposed adjacent said runway for intermittently generating said first radio frequency signal to cause said LEDs of each one of said LED assemblies to turn on for a predetermined time duration, said radio frequency transmitter also operating to transmit a radio frequency synchronizing signal;

a camera disposed on said aircraft at a position so as to be able to view said runway as said aircraft approaches said runway;

a radio frequency receiver disposed on said aircraft responsive to said synchronizing signal for turning on said camera while said LEDs are turned on to obtain a plurality of first images including radiant energy from said LEDs and radiant background energy, said radiant background energy tending to obscure said operator's view of said runway, and for obtaining a plurality of images of second images of said runway when said LEDs are not turned on, said images of said runway when said LEDs are not turned on representing only said radiant background energy;

a processor for subtracting said plurality of second images from said plurality of first images to produce a plurality of filtered images representing substantially only said radiant energy from said LEDs; and a display for displaying said filtered images to said operator of said aircraft as said operator approaches said runway upon a landing approach.

26. The apparatus of claim 25, wherein each one of said LEDs of each of said LED assemblies is pulsed on approximately 15 times per second; and wherein each said on pulse has a duration of approximately 13 milliseconds.

27. The apparatus of claim 25, wherein said camera is turned on approximately 30 times per second to provide said plurality of first images and said plurality of second images.

a display viewable by said operator of said aircraft for displaying said filtered images delineating said runway as said aircraft approaches said runway during a landing approach.

28. The apparatus of claim 25, wherein said display comprises a video monitor.

29. The apparatus of claim 28, wherein said selector enables said operator of said aircraft to switch synchronization of said system, in real time, from one of said plurality of radiant energy sources to the other.

30. The apparatus of claim 25, wherein said camera comprises a charge coupled device (CCD) camera.

31. The apparatus of claim 30, wherein said CCD camera includes a bandpass filter centered at a LED center wave length of said LEDs to thereby permit said camera to reject at least a portion of said radiant background energy.

32. The apparatus of claim 30, wherein said CCD camera provides a horizontal field of view (FOV) of approximately between about 40°–20°.

* * * * *

UNITED STATES PATENT AND TRADEMARK OFFICE

CERTIFICATE OF CORRECTION

PATENT NO. : 6,119,055

DATED : September 12, 2000

INVENTOR(S) : Isaac Richman

It is certified that error appears in the above-identified patent and that said Letters Patent is hereby corrected as shown below:

Column 16, Line 45, Claim 27, delete the following:

"a display viewable by said operator of said aircraft for displaying said filtered images delineating said runway as said aircraft approaches said runway during a landing approach."

Signed and Sealed this

Eighth Day of May, 2001

*Attest:*

NICHOLAS P. GODICI

*Attesting Officer*

*Acting Director of the United States Patent and Trademark Office*